Nov. 21, 1967  H. N. ANDERSON ETAL  3,353,572
VIBRATORY VOLUMETRIC FEEDING AND BAG FILLING APPARATUS
Filed July 12, 1965  5 Sheets-Sheet 5
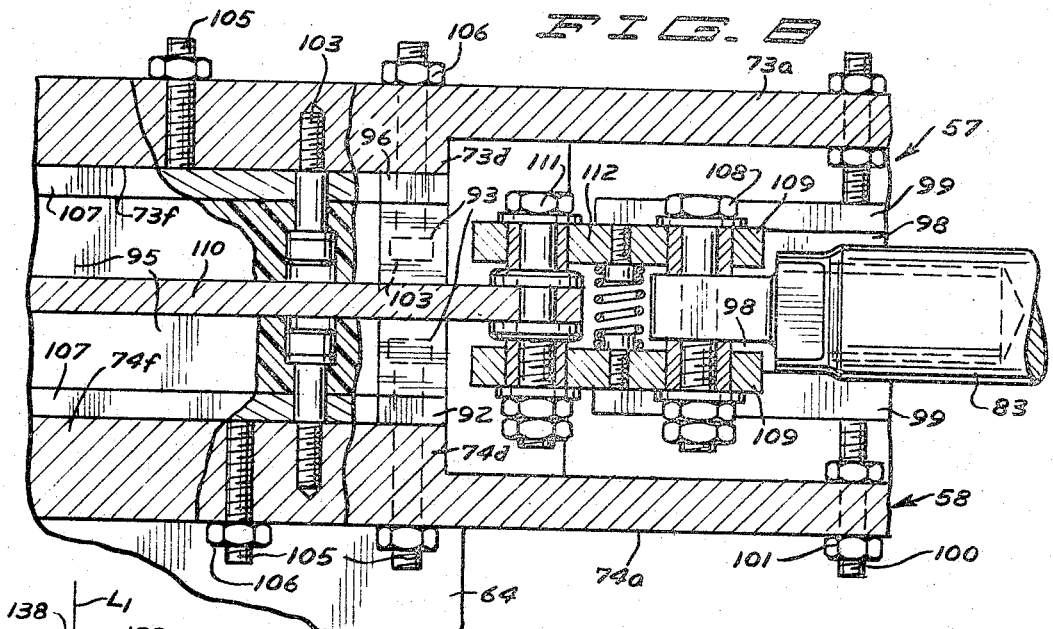
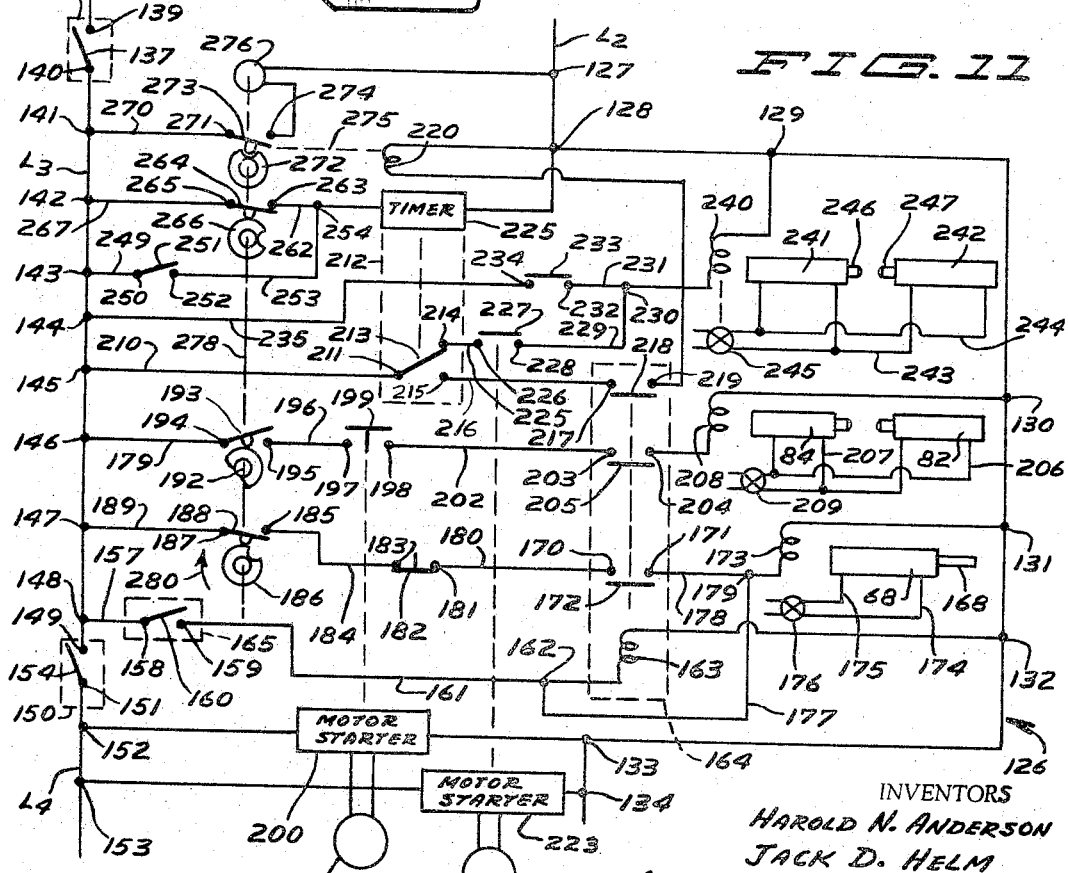
INVENTORS
HAROLD N. ANDERSON
JACK D. HELM
Dugger Johnson & Westman
ATTORNEYS

United States Patent Office 3,353,572
Patented Nov. 21, 1967

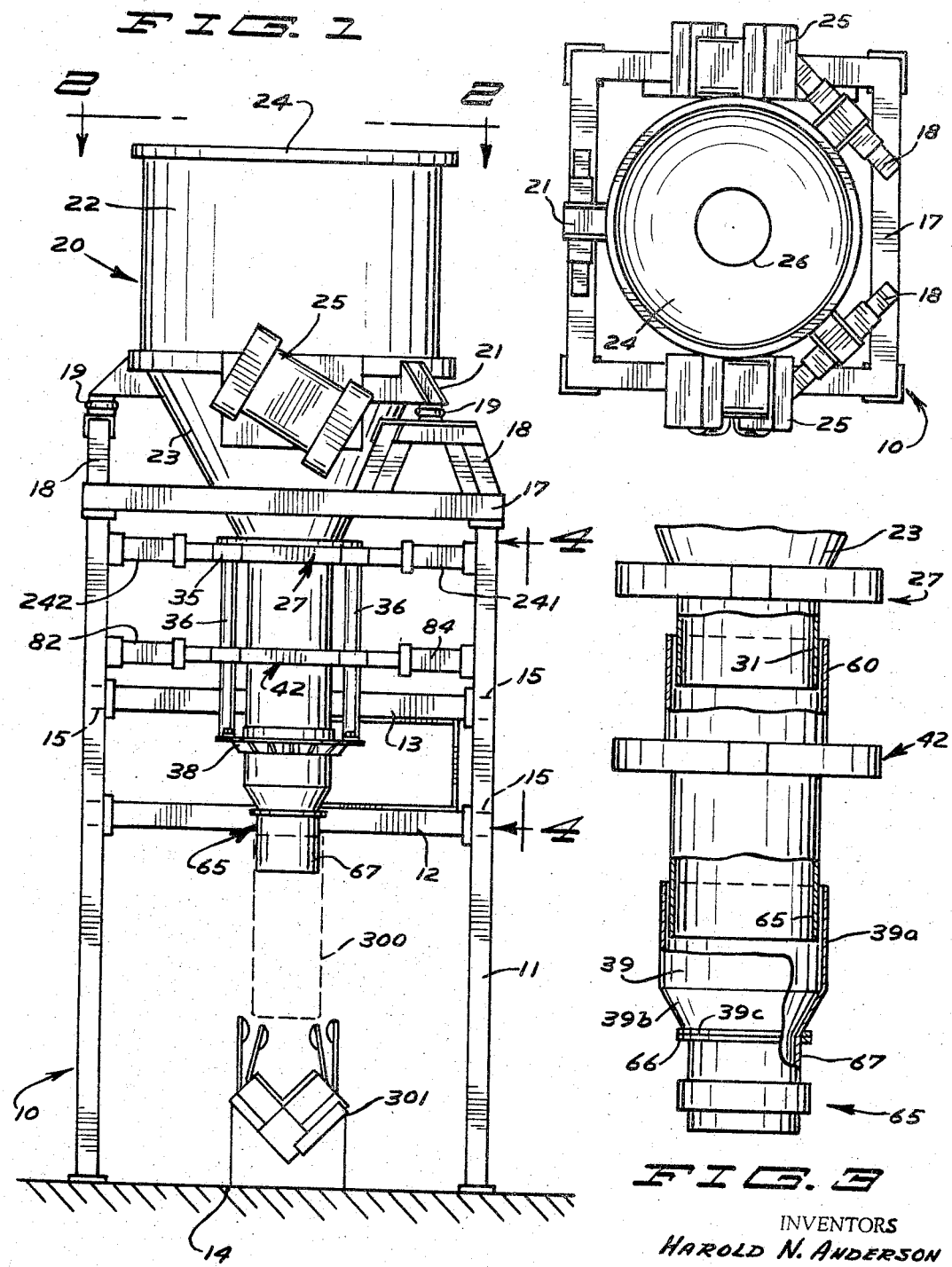

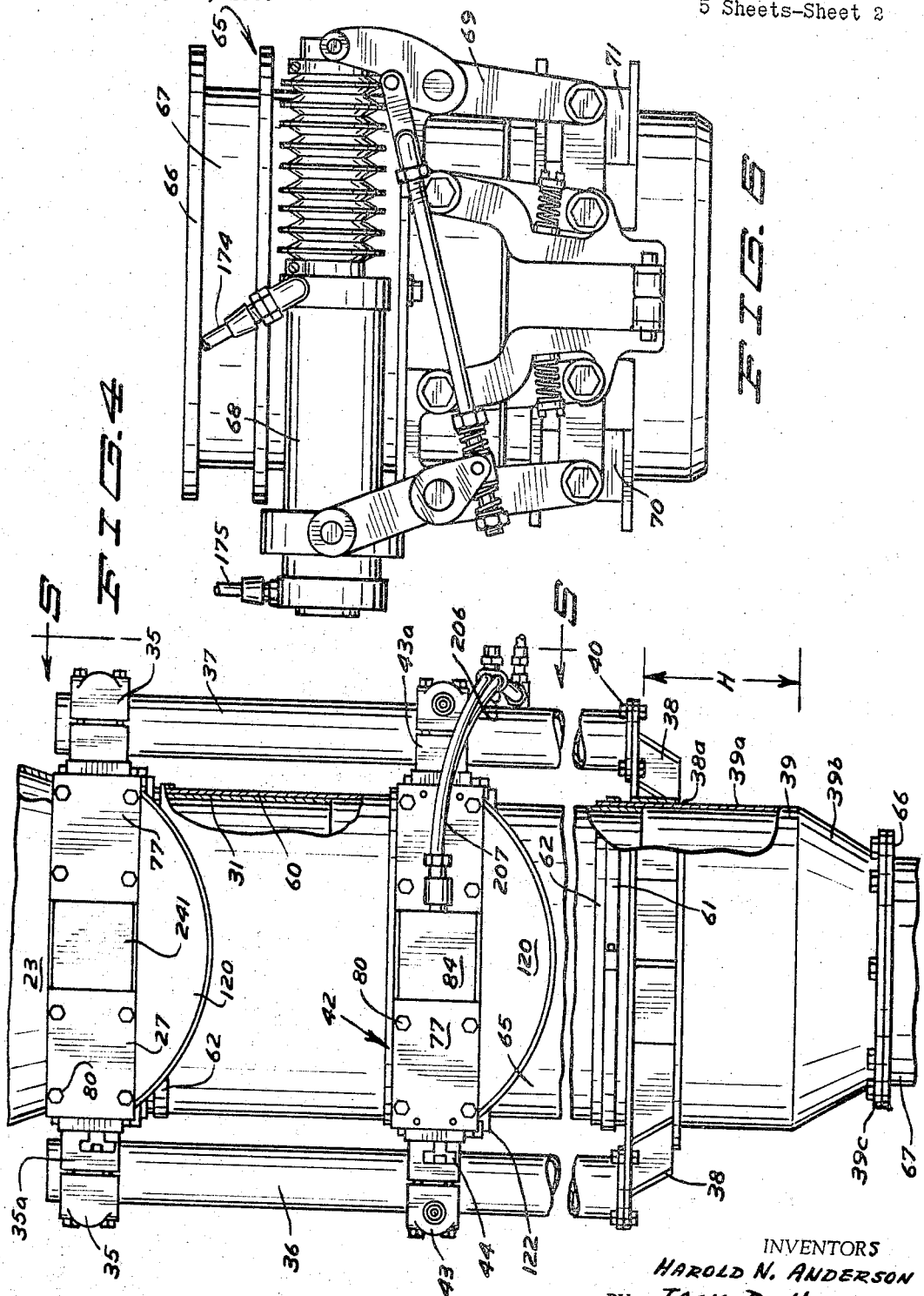

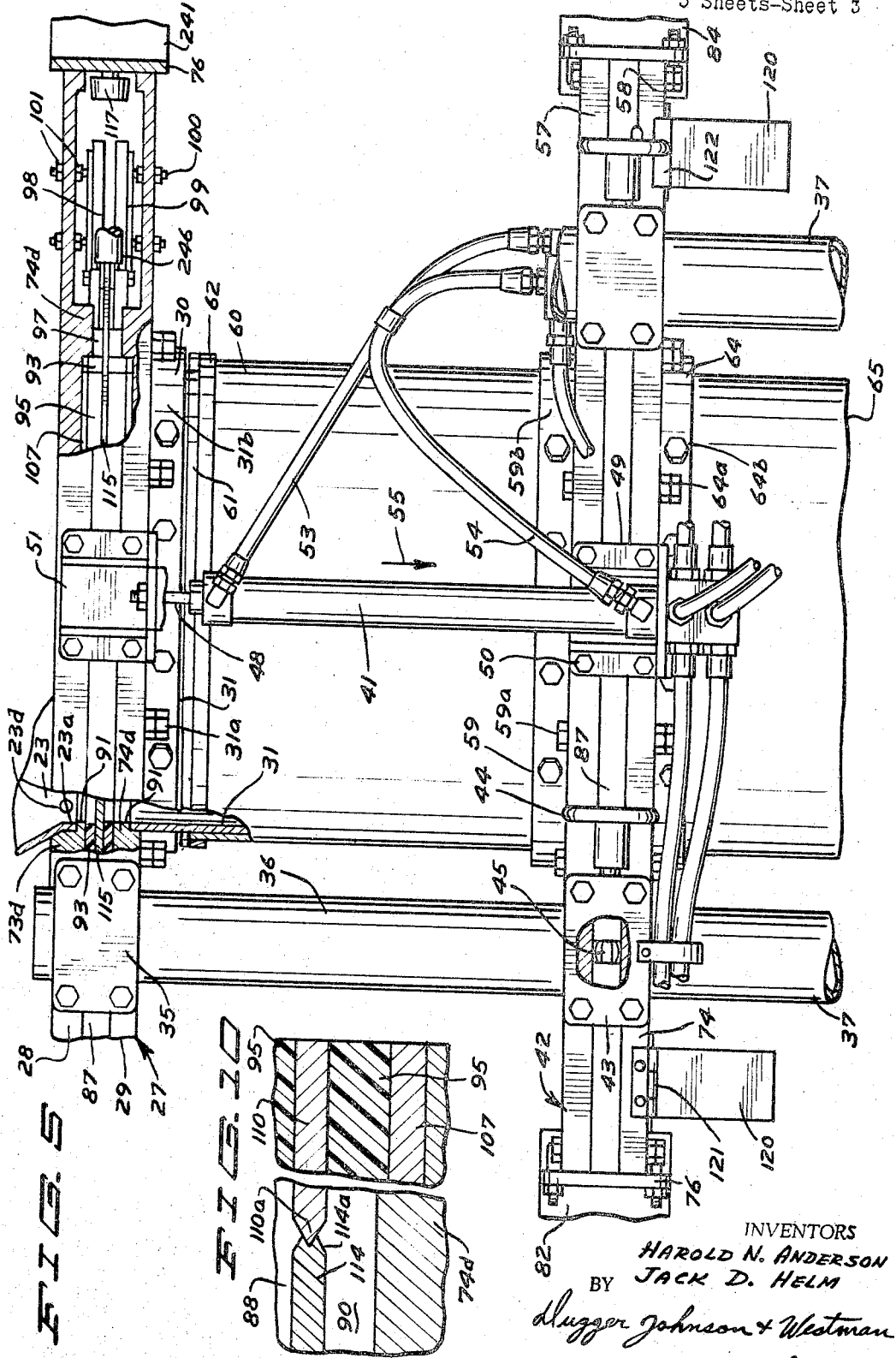

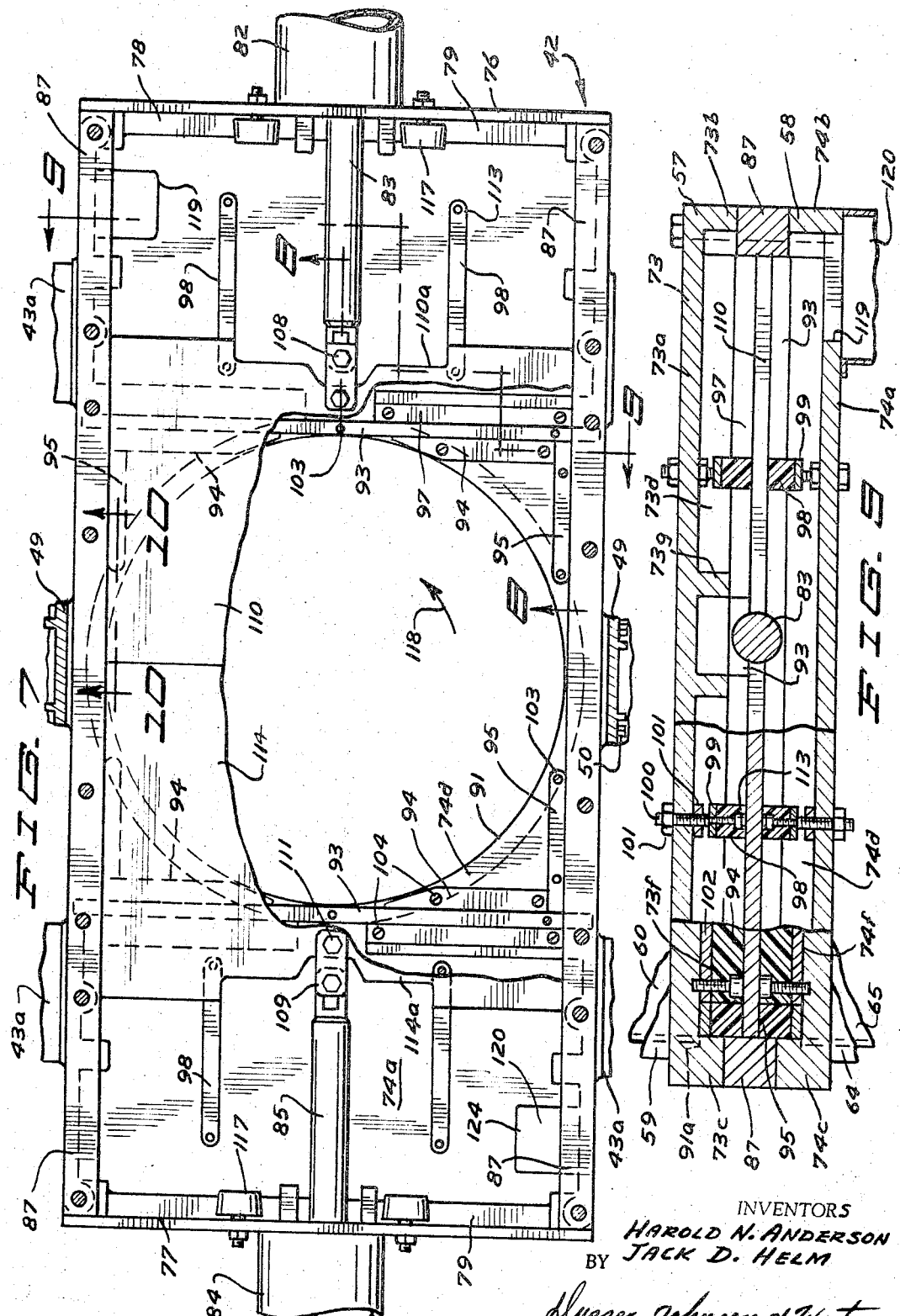

3,353,572
VIBRATORY VOLUMETRIC FEEDING AND BAG FILLING APPARATUS
Harold N. Anderson, Minneapolis, and Jack D. Helm, Maple Plain, Minn., assignors to Bemis Company, Inc., a corporation of Missouri
Filed July 12, 1965, Ser. No. 471,177
12 Claims. (Cl. 141—72)

ABSTRACT OF THE DISCLOSURE

Bag filling apparatus including a supply hopper mounted by vibration isolators on a frame, a volumetric measuring chamber dependent from the hopper, a bag holder assembly dependent from the measuring chamber, and a plurality of gyratory motor vibrators mounted on the hopper to impart vibratory motion to the hopper, measuring chamber, bag holder assembly and the bag held by the bag holder assembly whereby the circulatory motion is imparted to the product. The measuring chamber includes an upper and a lower slide gate housing, the vertical spacing of which can be varied a limited amount without varying the elevation of the bag holder assembly. Product retainers are provided on the lower housings for receiving product that works past transverse strips which bear against the slide gates.

---

This invention relates to new and novel vibrating apparatus for volumetrically measuring a charge and feeding a measured charge into a bag. More particularly, this invention relates to a new and novel apparatus for volumetrically meausuring a charge and feeding the charge into a bag that includes vibrating a supply hopper, a volumetric measuring chamber, a bag holder and a bag on the holder as a single unit.

Problems have been encountered in prior art mechanism for volumetrically measuring and filling bags with "hard to move" products which have poor flow characteristics, for example, powdered sugar, mixes containing shortening, feed containing molasses, and many other type products. One of the problems arises from the tendency of such products to "bridge." In handling products of the aforementioned nature, which are to be packed tightly in a bag, frequently damage results to the product or to the bag through utilizing an auger to compress the product in the bag. Additionally, volumetric bag feeding and filling apparatus of prior art is hard to clean. In order to overcome problems of the aforementioned nature, this invention has been made.

One of the objects of this invention is to provide a new and novel volumetric feeding and bag filling machine having a supply hopper, a volumetric chamber and a bag holder that have imparted thereto a vibratory motion from a common source of power. Another object of this invention is to provide a new and novel volumetric feeding and bag filling machine that includes a supply hopper, a volumetric measuring chamber, and a bag holder for releasably retaining a bag that in combination with the bag are vibrated as a single unit. In furtherance of the last mentioned object, and still another object of this invention is to impart vibratory motion that has both a horizontal and vertical components.

An additional object of this invention is to provide new and novel apparatus for measuring definite volumes of uniformly conditioned product to give good consistent weights without the need of a scale. A still further object of the invention is to provide in attached vertical alignment, a product supply section, a volumetric measuring chamber having slide knife sub-assemblies and a bag holder wherein there are not provided any corners that product in normal flow would contact; but rather, the product contact surfaces are circular such that an entire unit self cleaning action is obtained.

Another object of the invention is to provide a product supply section, a volumetric measuring chamber, and a bag holder that are connected together and vibrated as a single unit to impart a steady circular motion to the product as the product sequentially moves through the supply section and measuring chamber to a bag on the bag holder.

A still additional object of this invention is to provide a new and novel dual knife valve sub-assembly having mechanism for receiving and containing the product that works past a sealing strip and enters a valve chamber portion radially outwardly of the normal vertical compenent of motion of the product past the knives when the knives are in an open condition.

Other and further objects of the invention are those inherent in the invention herein illustrated, described and claimed, and will become apparent as the description proceeds.

To the accomplishment of the foregoing and related ends, this invention then comprises the features hereinafter fully described and particularly pointed out in the claims, the following description setting forth in detail certain illustrative embodiments of the invention, these being indicative, however, of but few of the various ways in which the principles of the invention may be employed.

The invention is illustrated by reference to the drawings wherein corresponding numerals refer to the same parts and in which:

FIGURE 1 is a vertical side elevational view of the volumetric feeding and bag filling apparatus of this invention together with showing an associated conveyor for receiving the filled bag;

FIGURE 2 is a plan view of the apparatus of this invention, said view being generally taken along the line and in the direction of the arrows 2—2 of FIGURE 1;

FIGURE 3 is a somewhat enlarged diagrammatic illustration of the lower portion of the supply hopper, the various tubes associated with the above mentioned structure, and the knife valve assemblies, portions of said tubes being broken away to more clearly illustrate the relation of the tubular portions of the apparatus to one another;

FIGURE 4 is an enlarged fragmentary front view with portions being broken away, said view being generally taken along the line and in the direction of the arrows 4—4 of FIGURE 1;

FIGURE 5 is a still further enlarged fragmentary side view of a portion of the structure of FIGURE 4, said view being generally taken along the line and in the direction of the arrows 5—5 of FIGURE 4, but having portions broken;

FIGURE 6 is a vertical elevational view of the bag holder that is attached to the lower end portion of the structure of FIGURE 4;

FIGURE 7 is an enlarged plan view of a knife valve assembly of this invention with the upper housing removed and portions of the knives and cylinders being taken away;

FIGURE 8 is an enlarged fragmentary cross sectional view generally taken along the line and in the direction of the arrows 8—8 of FIGURE 7 to show various features of the knife valve assembly;

FIGURE 9 is a cross sectional view generally taken along the line and in the direction of the arrows 9—9 of FIGURE 7;

FIGURE 10 is an enlarged fragmentary view generally taken along the line and in the direction of arrows 10—10 of FIGURE 7 to show the mating of the knife blades; and FIGURE 11 is a schematic diagram of the various electrical and pneumatic components and diagrammatically depicts various structure elements with which said components are associated.

Referring now in particular to FIGURES 1 and 2, the volumetric feed and bag filling apparatus of this invention, generally designated 10, includes four vertical support members 11 having their lower ends mounted on the floor (supporting surface) 14 and spaced to be located at the corner portions of a rectangle, intermediate cross braces 12 and 13 extending between two of the frame members 11 and four transversely extending cross braces 15. Secured to the upper ends of the support members 11 is an open box sub-frame 17. On the sub-frame 17 there are provided three generally U-shaped mounting brackets 18 that have web portions extending parallel to the general plane of the sub-frame 17 and located vertically thereabove. Each of the brackets 18 has a fluid-filled isolator 19 attached to its web portion for mounting the hopper frame 21 of the supply hopper, generally designated 20. The hopper 20 also includes a cylindrical tubular portion 22 extending upwardly above the frame 21 and riveted thereto, and a frusto-conical tubular portion 23 having its major base joined to tubular portion 22 to form a smooth continuation thereof. A cover 24 having a cover inlet aperture 26 is provided on tubular portion 22. To diametrically opposed portions of the tapered hopper 23, there are secured a pair of vibrators 25 that each includes a gyratory motor with eccentric weights on each of their shafts to rotate therewith and thereby cause a directionally imparted vibration to the hopper 20. This vibrating motion moves the entire mass of product in the hopper (and in the structure depending therefrom) in a whirlpool motion, thus eliminating any tendency of the product to bridge over the hopper discharge opening. The isolators 19 and the hopper 20, which includes members 21–23 and 25, advantageously is of the type manufactured by Carrier Manufacturing Company, Jeffersonville, Ind. The lower end portion of tapered tube 23 is annular that provides a central discharge aperture 23a that discharges through aperture 91 provided in the top, generally horizontal wall of the upper valve housing 28 which forms a part of the upper valve sub-assembly generally designated 27 (see FIGURE 5). The annular end portion is riveted at 23d to housing 28, with heads of the rivets forming a smooth continuous surface of said annular portion.

The upper valve sub-assembly 27, the construction of which will become more apparent hereinafter, also includes a lower valve housing 29 having a central aperture 91 formed in its bottom, generally horizontal wall, and an annular flange 30 bolted at 31a to said bottom wall in depending relation thereto such that the opening through the annular flange is concentric to the central aperture in said bottom wall. A fixed top tube 31 is riveted at 31b to the annular flange 30 to depend therefrom and has a smooth interior surface providing a straight line continuation of the interior surface of the bottom opening 23a of tapered portion 23 but vertically spaced therefrom, the apertures 91 of housings 28, 29 having minimum diameter portions that are the same as the inside diameter of the lower end of tubular portion 23a and tube 31.

On opposite sides of the valve assembly 27 there is provided a pair of horizontally spaced split tubular clamps 35, each clamp 35 having one section 35a bolted to the valve housings 28, 29. Each clamp clampingly holds the upper end of one of the guide tubes 36, 37, respectively, such that the guide tubes depend therefrom.

Each of the guide tubes 36, 37 at its lower end has a base flange that is bolted at 40 to a bottom tube sub-frame 38. The sub-frame 38 mounts a fixed bottom tube 39 in a fixed position relative thereto, sub-frame 38 having a central aperture 38a through which the cylindrical portion 39a of the bottom tube 39 extends. Tube 39 also includes a frusto-conical portion 39b which at its upper edge is joined to the lower edge of cylindrical portion 39a, portion 39b being tapered inwardly in a downwardly direction. Through the provision of the sub-frame 38, guide tubes 36, 37 and clamps 35 clampingly holding said guide tubes in a fixed position, bottom tube 39 is held in fixed relationship to the tapered portion 23 of the hopper 20; although by loosening the clamps 35 the vertical position of tube 39 relative portion 23 can be adjusted.

A bottom valve sub-assembly, generally designated 42, of substantially the same construction as the top valve sub-assembly 27, includes a pair of horizontally spaced split ring clamps 43 at opposite sides thereof, each clamp 43 having a portion 43a bolted to sub-assembly 42. Each of the clamps 43 (and clamps 35) has a hand knob 44 secured to a clamp locking stud 45 which in conjunction with conventional structure permits readily loosening the clamping engagement on the guide tube by turning the hand knob 44. This facilitates vertically repositioning the bottom valve sub-assembly 42 relative the top valve sub-assembly 27 and the sub-frame 38. Once the hand knobs 44 are again tightened, sub-assembly 42 is again clampingly held in a fixed position relative sub-assembly 27 and sub-frame 38.

In order to facilitate moving the bottom valve sub-assembly 42 relative sub-assembly 27, there is provided a pair of two-way acting piston cylinder combinations each having a cylinder 47 and a piston rod 48. The combinations 47, 48 are located on diametrically opposite sides of the fixed top tube 31 and movable top tube 60. Each cylinder 47 is attached to a mounting bracket 49 which in turn is bolted at 50 to the respective central side portion of the bottom valve sub-assembly 42. Likewise, a mounting bracket 51 is bolted to a central side portion of the top valve sub-assembly 27, the upper end of the piston rod 48 being bolted to brackets in a manner that is fixedly attached thereto. As a result of providing the piston cylinder combinations, at the time the hand knobs 44 are turned to loosen the clamping engagement of the clamps 45 relative to the guide tubes, and upon providing oil under pressure through line 54 at the bottom of the cylinder, the cylinders 47 will move in a vertically downwardly direction 55 relative the sub-assembly 27 to move the sub-assembly 42 from its uppermost position of FIGURE 5. Similarly, if the sub-assembly 42 is already in a lowered position from that illustrated in FIGURE 5, upon directing oil under pressure through line 53 to the upper end of the cylinders 47, the sub-assembly 42 is moved in a direction opposite arrow 55 toward the position illustrated in FIGURE 5. Accordingly, by loosening the clamping engagement of clamps 43 with the guide tubes, the vertical spacing between the sub-assemblies 27 and 42 may be adjustably varied; and in the selective relative adjusted position, the knobs 44 are turned to clampingly hold the sub-assembly 42 on the guide tubes in a fixed position relative sub-assembly 27.

The bottom valve sub-assembly 42 (see FIGURES 5 and 7–9) includes a top housing 57 and a bottom housing 58, the generally horizontal wall 73 of the top housing having a central aperture 91 therethrough. An annular flange 59 is bolted at 59a to the aforementioned wall of the housing in a position to extend upwardly thereabove in surrounding relationship to said aperture. The annular flange in turn has the lower edge portion of the adjustable top tube 60 extended thereinto and riveted thereto at 59b in a manner that the heads of the rivets provide a smooth continuation of the inner peripheral wall of the tube 60. The lower edge of tube 60 abuts against shoulder 91a of aperture 91, the minimum diameter of aperture 91 being the same as the inside diameter of tube 60. The tube 60 extends upwardly from the top housing 57 and has its upper end in slidable surrounding relationship to the fixed top tube 31 (see FIGURE 4). There is provided a clamp 61 and a sealing gasket 62 on the upper end of the tube 60 which provides a tight sealing, slidable fit with the fixed top tube 31.

The generally horizontal wall 74 of the bottom housing 58 is provided with a central aperture 91 and has an annular flange 64 bolted at 64a in depending relationship thereto. The upper end of the adjustable bottom tube 65 is extended into and riveted at 64b to the flange 64 in a manner described with reference to flange 59 and tube 60. The inside diameters of tubes 60, 65 are substantially the same, tube 60 and 65 being mounted on the bottom valve sub-assembly 42 in vertical alignment. The lower end of the tube 65 slidably extends into the upper end portion of the cylindrical portion 39a, there being provided a clamp 61 and a gasket 62 on a cylindrical portion 39a to provide a slidably sealing fit between the upper end of tube 39 and the adjacent portion of tube 65.

The tubes 60 and 65 are mounted on the bottom valve assembly 42 to be vertically adjusted therewith. With the valve sub-assembly 42 in its uppermost position of FIGURE 4, it may be adjusted vertically downwardly relative tubes 39 and 31 within the range of dimension H to selectively vary the volume of the chamber between said assemblies as will be more apparent hereinafter.

The lower end of tubular portion 39b has an annular flange 39c to which there is bolted a corresponding annular flange 66 of the spout 67, the inside diameter of spout 67 being substantially the same as the minor base inside diameter of tubular portion 39b, and the opening of portion 39b being substantially coextensive with the opening through spout 67. The spout 67 forms part of the bag holder sub-assembly, generally designated 65. Since the sub-assembly 66 is of substantially the same construction as the bag holder disclosed in U.S. Patent No. 2,703,671, other than the upper end of spout 67 is not divergently tapered in an upward direction, it will not be described in detail. However, it is to be noted that the bag holder 65 does include a two-way acting piston cylinder combination 68 that through linkages 69 operate the bag gripper jaws 70, 71 (which are located on diametrically opposite sides of the spout) between the closed bag gripping position of FIGURE 6 and a spread apart position whereby the mouth end of a bag may be readily positioned over the spout and thence the gripper jaws move to a clamping position to clamp the bag on the spout to supportingly hold the bag.

Since the valve sub-assemblies 27 and 42 are of substntially the same construction and other than for the specific tubes attached thereto, primarily only sub-assembly 42 will be further described in detail (see FIGURES 5 and 7-9). Before proceeding with the description of sub-assembly 42, it is to be noted that sub-assemblies 27 and 42 are not in any manner joined to the support members 11, but rather that sub-assembly 27 is completely supportingly mounted by the tapered portion 23 of the hopper 20 and that the sub-assembly 42 is supportingly mounted in the manner described heretofore. Thus the hopper 20 provides the sole support for the volumetric measuring chamber, the bag holder sub-assembly and the bag that is clamped to the spout 67.

The bottom valve sub-assembly 42 includes the top housing 57 and the bottom housing 58, the top housing including top wall 73a, which has a generally planar top surface, and depending side flanges 73b, 73c. Likewise, the bottom housing includes a bottom wall 74a having a generally planar bottom surface and upwardly extending side flanges 74b, 74c. Each of the housing front and rear ends are provided with reinforcing flanges 78, 79 that are of a smaller height than the side flanges and are spaced from one another such as shown for housing 57 in FIGURE 7. To the flanges 78, 79 there is respectively bolted a front plate 77 and a rear plate 76 by bolts 80. The plates 76, 77 in part serve to mountedly hold the housings 57, 58 in spaced relationship. The rear plate mounts a cylinder 82 of a two-way acting piston cylinder combination to extend outwardly therefrom, said combination including a piston rod 83 extended through an appropriate aperture provided in the rear plate vertically between the top and bottom walls 73a, 74a. Likewise, the front wall 77 mounts a cylinder 84 of a two-way acting piston cylinder combination that also includes a piston rod 85 extended between walls 73a, 74a. As may be noted from FIGURE 7, the central axes of the piston rods 83, 85 are located along a common line and are reciprocally movable from the extended condition (valve closed position) of FIGURE 7 to a retracted valve open condition substantially more horizontally spaced from one another than that shown in said figure.

To be noted is that the upper housing is provided with a pair of parallel reinforcing strips 73g horizontally located on opposite sides of each of the piston rods that extend from adjacent the land 73d to adjacent the reinforcing strip 78, 79, respectively. However, the lower housing does not have a counterpart of reinforcing strip 73e.

Adjacent each of the walls 76, 77 there is provided a guide 87 for retaining the side flanges 73b, 74b, and 73c, 74c, respectively, in spaced relationship to one another. As may be noted from FIGURE 7, the guides 87 at each side of the housing are substantially longitudinally spaced from one another. The upper and lower housings are bolted together by bolts extending through the respective side flanges and guide 87.

Each of the housings 57, 58 has a central, generally rectangular land 73d, 74d respectively that extends away from the generally planar surfaces of the top wall 73a and the bottom walls 74a to the same elevation as the respective side flanges. Each of the respective lands and walls 73a, 74a has a central aperture 91 extended therethrough of a minimum diameter that is substantially the same as the inside diameters of the tube 60 and 65, each land being provided with enlarged diametric portion 91a to form a shoulder against which the respective aforementioned tubes abut.

Bolted to each of the lands to extend transversely tangentially up to the minimum diameter portion of aperture 91 between the side flanges are somewhat resilient slide strips 93 and adjustment bars 92. The slide strips are secured to the respective housing by countersunk flat headed cap screws 103 with bars 92 positioned in groove 96 in the land, and the adjacent slide strip extended into the same groove in face to face abutting relationship with bar 92. The adjustment feature will be described below.

At each corner portion of each land that is bounded by an arcuate portion of aperture 91, a portion of slide strip 93, and a portion of members 88–90 is a transverse synthetic seal strip 94 and a longitudinal synthetic slide strip 95 extending at right angles to the strip 94. In order to mount each set of strips 94, 95 the respective corner portions of each of the lands is provided with a right angle recess 73f, 74f respectively in which there is provided a spacer bar 107 underlying strip 95 and an adjustment bar 102 under underlying strip 94. Countersunk cap screws 104, 103 are extended through each of the strips 94, 95, respectively, and the respective spacer bar and adjustment bar and thence threaded into the land. A pair of studs 105, which are slotted at one end, are also threaded into the respective housing for each of the strips 93, 94 to bear against the surface of the respective adjustment bar 92, 102 that is opposite its associated slide strip to selectively adjust the elevation of the slide strip. A locking nut 106 is provided for each stud 105. If the elevation of, for example, strips 93, 94 of housing 58 is to be raised, then associated cap screws are unthreaded a limited amount, the lock nuts unthreaded a limited amount, and studs 105 further threaded into the housing to raise the adjustment bars and thereby strips 93, 94.

Between each of the slide strips 93 and the front and rear walls 77, 76 respectively there are provided a pair of transversely spaced, transversely extending sealing strips 97 (adjacent each slide strip 93) that are secured to the respective land 73d, 74d by countersunk cap screws 113. Further, on each of the housings there is provided a longitudinally extending slide strip 98 on each transverse side of the respective piston rod. Each slide strip 98 has a pair of countersunk screws 104 extended therethrough and through an adjustment bar 99 to be threaded into the adjacent end of the lock stud 100 (see FIGURE 9). The lock stud 100, for example for the top wall 73a, is threaded into the top wall to abut against the adjustment bar 99. By appropriately turning the lock nuts 101 (one above and one below wall 73a) on the threaded lock stud 100, the lock stud may be further threaded through wall 73a and thereby force the adjusting bar and strip 98 of the top housing in a downward direction. In a similar manner the strips 98 of the lower housing may be vertically adjusted.

To each of the piston rods 83, 85 there is pivotally attached by a pivot member 108, a pair of short links 109 (see FIGURES 7 and 8). The links 109 for the piston rod 83 are pivotally connected to a slide gate 110 by pivot member 111, there being provided a coil spring 112 for resiliently urging the links 109 in a spread apart condition. As may be noted from FIGURE 8 the links 109 extend on opposite sides of the plate 110 and the connection to the piston rod. Likewise, the links 109 for the piston rod 85 are pivotally connected to the slide gate 114 by a pivot member 111. As may be noted from FIGURE 7, when the piston rods 83, 85 are in their extended condition, the slide gates 110, 114 have adjacent edges in abutting relationship in a plane of the diameters of tubes 60, 65 and are of a dimension in one direction to form a close fit with the respective slide guides 87. As may be noted from FIGURE 10, the forward edge of the slide gate 114 is grooved at 114a to receive the adjacent tongue portion 110a of the slide gate 110 whereby said knives in a piston rod extended condition forms a close fit to prevent product falling therebetween.

In a direction at right angles to the aforementioned direction, of the preceding paragraph, the gates 110, 114 are of a dimension to completely overlie the aperture 91 in the housing 58 and slide strips 94, 95; and respectively extend a substantial distance radially beyond the aperture to overlie the strips 93, 94, 97 and a portion of slide strips 98 of the lower housing while the same seal and slide strips of the upper housing bear against the top surfaces of the slide gates. By properly adjusting the elevation of the aforementioned slide strips 93, 95, 98, the slide gates 110, 114 are retained in the horizontally aligned condition.

The slide gates are movable from their valve closed position by the respective piston cylinder combinations 82, 84 from the FIGURE 7 position to a position that the rear edge 110a of slide gate 110 and the front edge 114a of slide gate 114 will abut against the rubber stops 117 mounted on the rear wall 76 and the front wall 77 respectively.

As may be in part noted from FIGURE 8 for slide gate 110 there is provided space (valve chamber) within the lower housing at a lower elevation than the slide gate and in a horizontal area between slide strip 93 and sealing strip 97 and the reinforcing bar 77, 78 in which product under the slide gate that works past the sealing strips may enter the chamber in the lower housing. Due to the vibration imparted through the vibrators 25, the product in the aforementioned valve chamber also circulates in a counter-clockwise rotation (direction of the arrow 118). Such product works its way through the discharge opening 119 adjacent side flange 74b and reinforcing flange 78 to fall through said opening into the container 120 that is hingedly mounted therebeneath by hinge 121. A latch 122 is provided for holding the container in a hinged closed position.

In the diagonally opposite corner of the lower housing there is also provided a discharge opening 124 and a hinge container 120 that serve the same function for product that works beneath slide gate 114 and into the valve chamber in which the piston rod 85 operates.

It is believed that it is obvious from the preceding description that any product that works past the strips 93, 97 of the upper valve assembly will work along the upper surfaces of the slide gates and thence fall over the rear edge and front edge of the slide gates 110, 114, respectively, into the adjacent valve chamber of the lower housing and thence work its way to the openings 119 and 124, respectively.

As to the product falling from the slide gates onto the corner portions of the lands of the lower housing that are in part bounded by the strips 94, 95 and the respective arcuate portion of the aperture 91, the aforementioned counter-clockwise motion results in the product on the land corner portions gradually working in the direction of the arrow 118 to either adjacent the side flanges where it falls through tube 65 or to arcuate portion in said direction of rotation of one of two sealing strips 94 that is substantially coextensive with the aperture 91 to thence fall into tube 65. It is believed it is obvious that any product on the upper surface of the slide gates that does not work past the strips 93 falls onto the aforementioned land corner portions.

The upper valve assembly 27 is of the same construction and functions the same as the lower valve assembly 42 other than the piston rods and cylinders for the slide gates 115 are designated 246, 247 and 241, 242, respectively, and tapered portion 23 has a vertical cylindrical section 23a that opens through the aperture on the top housing 28 of assembly 27 in the manner of tube 60 for assembly 42 and the upper end of tube 31 opens into the lower housing 29 of assembly 27 and is secured thereto in the manner of tube 65 for assembly 42. Housings 28, 29 are substantially the same construction as housings 57, 58 while one slide gate 115 is the same as gate 110 and the other the same as gate 114.

Referring now to FIGURE 11, the control circuitry and control elements, generally designated 126 will now be described. The circuitry 126 includes main electric power supply lines L, and L₂, main line L₂ having junctions 127 to 134 inclusive located thereon. The main line L₁ is connected to a first contact 139 of the master ON-OFF switch 138. The switch 138 includes a second contact 140 and a switch member 137 manually movable between an "off" position and an "on" position electrically connecting contacts 139 and 140.

A line L₃ electrically connects contact 140 to a first contact 149 of the motor on-off switch 150. There are provided junctions 142–148 inclusive on line L₃.

The motor switch 150 includes a second contact 151 and a manually operated switch member 154 that is movable between an "off" position, and an "on" position electrically connecting contacts 149 and 151. A line L₄ is electrically connected to contact 151 and includes junctions 152, 153.

A line 157 connects the first terminal 158 of the foot switch 165 to junction 148, the foot switch having a second terminal 159 and a switch member 160 that electrically connects terminals 158, 159 when the foot switch is depressed. Terminal 159 is connected to junction 162 by a line 161, there being provided a solenoid coil 163 of a relay 164 that is electrically connected across junctions 162 and 132. Line 177 connects junction 162 to junction 179.

The relay 164 includes a first terminal 170, second terminal 171, and a switch member 172 for alternately making an electrical connection between terminals 170, 171 and breaking the aforementioned connection. The solenoid coil 173 of a solenoid operated air-valve is connected across junction 179 and junction 131, junction 179 being connected by a line 178 to terminal 171. The aforementioned solenoid operated air valve is provided in fluid line 174 which is fluidly connected to the one end of cylinder 68 for operating its piston rod 168 to a retracted, jaw open position upon application of air under pressure therethrough, and a line 175 for alternately applying air under pressure to the opposite end of the cylinder to effectuate movement of the piston rod of said cylinder to an extended condition. The solenoid operated air valve also includes valve member 176 in lines 174, 175 that is operated through coil 173 to operate member 176 to apply air under pressure through line 175 when coil 173 is energized, and through line 174 when de-energized.

Relay terminal 170 is connected by a line 180 to the first terminal 181 of a manually operable switch that upon manually being depressed results in the bag holder jaws being moved to an open condition. Switch member 182 normally is in an "on" position electrically connecting terminal 181 to a second terminal 183 of said switch.

Terminal 183 is connected by a line 184 to the terminal 185 of the bag holder cam which is part of a conventional multi-cam timer. The bag holder cam includes a cam member 186 that has a cylindrical surface other than for an indentation such as indicated in FIGURE 11. The bag holder cam also includes a second terminal 187 and a switch member 188 having a cam follower protrusion bearing against the cam surface of cam member 186. The switch member 188 is resiliently urged (by a spring not shown) to bear against the cam surface of cam member 186 and thus normally electrically connects terminals 185, 187, but when its protrusion moves into the cam member indentation, the electrical connection between terminals 185, 187 is broken. The bag holder cam terminal 187 is connected by a line 189 to junction 147.

The multi-cam timer also includes a lower knife valve cam having a cam member 192, and a cam switch 193 electrically connected to cam terminal 194 and having a cam follower protrusion. Switch member 193 is resiliently urged to hold the protrusion against the cam surface of member 192. When the cam member 192 has been rotated so that the protrusion of switch member 193 slides in the cut-out in member 192, switch member 193 electrically connects terminal 194 and the second terminal 195 of the lower knife valve cam. Terminal 195 is connected by a line 196 to a first terminal 197 of a conventional motor starter 200. Motor starter 200 also includes a second terminal 198 and a solenoid operated switch contact 199 that in a motor starter energized condition electrically connects terminals 197, 198 but in a de-energized condition breaks the aforementioned connection. The solenoid coil (not shown) of the motor starter 200 is electrically connected across junctions 152, 133. Motor starter 200 is provided for the motor 201 of one of the vibrators 25. Motor 201 is energized through the starter 200 when power is applied across junctions 133, 152.

The terminal 198 is electrically connected by a line 202 to the third terminal 203 of the relay 164. Relay 164 includes a fourth terminal 204 and a solenoid operated switch contact 205 that in a solenoid coil 163 energized condition electrically connects terminals 203, 204 but in a de-energized condition breaks the aforementioned connection.

The solenoid coil 208 of a solenoid operated air valve for the lower knife assembly is connected across terminal 204 and junction 130. The last mentioned solenoid operated air valve is connected in a fluid lines 206 which are fluidly connected to the ends of the cylinders 82, 84 for applying air under pressure thereto to effectuate movement of the lower slide gates to a valve closed position. Fluid lines 207 are connected to the opposite ends of the cylinders 82, 84 for selectively applying air under pressure to effectuate movement of the slide gates to the valve open condition, lines 207, 206 being connected to solenoid operated valve member 209 of the last mentioned solenoid operated air valve. When solenoid coil 208 is energized, air is applied under pressure to the ends of cylinders 82, 84 to move the respective lower slide gates apart, but upon being de-energized, operates valve 209 so that the slide gates are moved toward one another.

Junction 145 is connected by line 210 to a first terminal 211 of a timer 212. The timer 212 includes a movable switch contact 213 that is electrically connected to terminal 211 and is movable between a position electrically connected to a second terminal 214 and alternately to a third terminal 215. Terminal 215 is connected by a line 216 to a fifth terminal 217 of relay 164, there being provided a movable switch contact 218 for electrically connecting terminals 217 and a sixth terminal 219 when the solenoid coil 163 is energized. The solenoid coil 220 of the multi-cam timer is connected across the sixth terminal 219 and the junction 128. The function of solenoid coil 220 will be set forth hereinafter.

The timer terminal 214 is connected by a line 225 to a first terminal 226 of a conventional solenoid operated motor starter 223, there being provided a second terminal 228 and a movable switch contact 227 that upon energization of the motor starter 223 moves the switch contact 227 to electrically connect terminals 226, 228 and upon de-energization breaks the aforementioned connection. The solenoid coil (not shown) of the motor starter 223 is electrically connected across junctions 153, 134, the motor starter energizing the vibrator motor 224 (other than the vibrator motor energized by motor starter 200) upon power being applied to junctions 153, 134. In this connection, it is to be noted that power is applied across terminals 133 and 152, and 153 and 134, respectively, when the motor switch 138 has been closed and the motor switch 154 is moved to a closed position electrically connecting terminals 149, 151.

The starter terminal 228 is connected by a line 229 to junction 230 which in turn is connected by a line 231 to the first terminal 232 of the manually operated upper knife switch. The last mentioned switch includes a manually operated switch contact 233 that upon being depressed electrically connects the terminals 232, 234 such that the upper slide gates will be moved to a valve open condition in a manner that will become more apparent hereinafter. Terminal 234 is connected by a line 235 to junction 144, while the solenoid coil 240 for the solenoid operated air valve for the upper slide gates is connected across junction 129, 230. The last mentioned solenoid operated air valve includes a valve member 245 that in solenoid coil 240 energized condition applies air under pressure through lines 243 to the one ends of cylinders 241, 242 for moving the upper slide gates apart, and alternately in a solenoid coil de-energized condition, applies air under pressure through lines 244 to the opposite ends of cylinders 241, 242 for moving the upper slide gates to the valve closed condition.

Line 249 connects junction 143 to the first terminal 250 of a cycle-control switch, said cycle-control switch also including a second terminal 252 and a manually operated switch member 251 that upon being depressed electrically connects terminals 250, 252, and in a second position breaks the electrical connection between 250, 252. Terminal 252 is connected by a line 253 to a junction 254, the timer motor 225 of the timer 212 being connected across junctions 254, 128.

Junction 254 is connected by a line 262 to a first terminal 263 of the timer reset cam of the multi-cam timer, the timer reset cam including a cam member 266 having a generally cylindrical surface other than for a recess provided therein, and a movable switch member 264 connected to a second terminal 265. Switch member 264 is resiliently urged such that its protrusion is retained in abutting relationship with the cam surface of cam member 266 and electrically connects terminals 263, 265 at all times other than when the cam member 266 has rotated to a position that the switch member protrusion falls into recess of cam member 266. At that time the electrical connection between terminals 263, 265 is broken, and remains broken until such time that the cam member 266 has rotated sufficiently that the switch member protrusion no longer is in the cam recess. Terminal 265 is connected to junction 142 by line 267.

Line 270 connects junction 141 to the first contact 271 of the timer holding cam of the multi-cam timer. The timer holding cam includes a second contact 274, a rotatable cam member 272 having a generally cylindrical cam surface other than for a recess, and a switch contact 273 electrically connected to terminal 271 and resiliently urged such that its protrusion rides on the cam surface of cam member 272. At the time the protrusion of the switch contact 273 is in the recess of cam member 272, the electrical connection between terminals 271, 274 is broken, however, when the cam member has been rotated sufficiently that the protrusion is no longer in the recess, switch contact 273 again electrically connects terminals 271, 274. The multi-cam timer has a cam motor 276 connected across terminal 274 and junction 127. To be mentioned, the multi-cam timer is of a construction that upon energizing solenoid coil 220, through conventional operating means 275, switch contact 273 is mechanically moved out of the recess of cam member 272 to electrically connect terminals 271, 274, and cannot fall back into the recess until such time that cam member 272 has been rotated through almost 360° wherein the protrusion of switch contact 273 is again free to move into the recess of the cam member 272 when the member 272 has rotated sufficiently. Through the aforementioned means, in cooperation with the cam member 272, cam member 272 and means 275 act as a single revolution clutch.

The cam motor 276 is drivingly connected to a shaft 278 which mounts each of the cam members 186, 192, 266 and 272 to rotate therewith. Thus, one 360° rotation of the shaft 278 rotates each of said cam members through 360°.

The structure of the invention having been described, the operation thereof will now be set forth. Prior to the time the master switch 138 is turned to an "on" position, the upper slide gates 115, and the lower slide gates 110 and 114 are each in a valve closed position; while the bag gripper jaws 70 are in spread apart open position. Accordingly, a supply of product in hopper 22, 23 is retained therein above the upper slide gates.

Prior to proceeding with a further description of the operation, it is to be mentioned that it is assumed that the lower valve assembly 42 has been clamped in a vertically adjusted position relative the upper valve assembly so that the volumetric chamber enclosed between the upper slide gates 115 and the lower slide gates 110, 114 and within the tubes 31, 60 is of a volume that when the product is uniformly packed therein, the packed product in the volumetric chamber will be the correct weight of charge to be filled in the bag. Proceeding on this assumption, now the master switch member 137 of the master switch is moved to "on" position to electrically connect terminals 139, 140. At this time the solenoid coil (not shown) of timer 212 is energized and moves its switch contact 213 to electrically connect terminals 211, 215; but does not start its timing cycle, nor is the solenoid coil 220 energized since the relay 164 has not been energized to move the switch contact 118 to provide an electrical connection between the fifth and sixth terminals 217, 219.

Now the operator places an empty bag over the spout of the bag holder 65 in a position that the upper edge portions of the bag can be gripped by the jaws 70, 71 and thence depresses the foot switch 165 to through switch contact 160 electrically connect terminals 158, 159. This energizes solenoid coil 163 of the relay 164 which moves switch contacts 172, 205, and 218 to a closed position to respectively electrically connect terminals 170 and 171, 203 and 204, and 217 and 219. As a result of energizing relay 164 there is provided a hold-in circuit through the bag holder cam switch 188, switch 182, switch 172 and line 177 to provide a hold-in circuit for solenoid coil 163. Also due to relay 164 being energized, the solenoid coil 173 of the bag holder solenoid operated air valve is energized to operate its valve member 176 whereby air is applied under pressure through line 175 to move the piston rod of cylinder 68 outwardly and thereby through linkages 69 move the bag holder jaws 70, 71 to a position to grip the bag on the spout.

After the master switch has been closed and before stepping on foot switch, the motor control switch 150 has its switch member moved to a closed position whereby power is applied to the motor starters 200, 223. Applying power to motor starter through their solenoid operated linkage moves switch contact 199 to electrically connect terminals 197, 198 and also energize motor 201 of one of the vibrators. Likewise, applying power to motor starter 223 through a solenoid operated linkage moves the switch contact 227 to electrically connect terminals 226, 228 and energize the motor 224 of the other vibrator. Upon the vibrators being energized, the entire unit that is supported on the isolators including the bag holder 65 is vibrated with both a horizontal and a vertical component of vibration.

The energization of relay 164, through movement of switch contact 218 to close the circuit between terminals 217, 219, results in cam timer solenoid 220 being energized. The energization of solenoid 220 moves the operating member 275 to lift the switch member 273 and thereby its protrusion out of the cam recess of cam member 272 such that cam member 272 is free to rotate; and also through the lifting of switch contact 273, electrically connect terminals 271, 274. Electrically connecting terminals 271, 274 energizes the cam timer motor 276 and drives the cam member shaft 278 to simultaneously rotate cam members 186, 192, 266 and 272 (in the direction of the arrow 280). A few degrees rotation of the lower valve cam member 192 positions the leading edge of the cam member cut-out beneath the protrusion of switch contact 193 and as a result switch contact 193 moves downwardly to electrically connect terminals 194, 195.

Electrically connecting terminals 194, 195 completes an electric circuit to energize solenoid coil 208 of the lower knife air valve to operate valve member 209 such that air under pressure is applied to lines 207 and air is exhausted through lines 206. This results in the slide gates 110, 114 being moved apart whereby any product between the aforementioned slide gates and slide gates 115 within the measuring chamber is free to fall through the tube 39. However, during the first cycle of operation, after first closing switches 138, 150, there is no product in the measuring chamber.

The cutout of cam member 192 is of a sufficient angular dimension that all the product in the measuring chamber will have time to discharge therefrom (after the first cycle) into the bag prior to the time the lower slide gates move to a valve closed position. Angular movement of cam member 192 brings the raised portion of said cam member into position to abut against the protrusion of switch member 193 and thereby move said switch member to break the electrical connection between terminals 194, 195. This de-energizes coil 208 and as a result valve member 209 is operated to apply air under pressure to lines 206 and exhaust air through lines 207. As a result the cylinders 82, 84 through their piston rods move the lower slide gates to a valve closed condition.

After the lower slide gates have been moved to a valve closed condition, shaft 278 has rotated sufficiently that the recessed portion of the timer reset cam member 266 is beneath the protrusion of switch member 264; and accordingly, this switch member now breaks the electrical connection between terminals 263, 265. This de-energizes the timer 225 and immediately starts its timing cycle. The de-energization of timer member 225 results in its switch 213 moving to electrically connect terminals 211, 214. Even though the cam timer solenoid 220 is de-energized, the electrical connection between terminals 271, 274 is not broken since the protrusion of switch member 273 is still bearing against the raised portion of cam member 272.

Electrically connecting terminals 211, 214 of the timer energizes the solenoid coil 240 of the upper knife valve assembly. Energizing coil 240 operates valve member 245 to apply air under pressure through lines 243 and exhaust air through lines 244 to thereby move the upper slide gates 115 apart. As a result product flows from hopper portion 23 between the upper slide gates into the measuring chamber to fill the measuring chamber. At the time the product is flowing between the upper slide gates, the entire assembly mounted on the isolators is vibrating and as a result product is brought to a uniform density within the measuring chamber. The timer cycle is sufficiently long to retain the slide gates in an open condition to insure that the measuring chamber is completely filled with uniformly packed product. Prior to the end of the timing cycle of timer 212, the protrusion of switch contact 264 is again on the raised portion of the cam surface of cam member 266. However, the timer does not move its switch member 213 until the end of the timing cycle. At the end of the timing cycle, switch member 213 breaks the electrical connection between terminals 211, 214 and electrically connects terminals 211, 215. Breaking electrical connection between terminals 211, 214 de-energizes solenoid coil 240 and as a result valve member 245 is operated so that air under pressure is applied through lines 244 and exhausted through lines 243 of cylinders 241, 242. As a result, the upper slide gates are moved to a valve closed position to prevent any further flow of product from the hopper to the measuring chamber.

During an interval of time after the lower slide gates have been moved to a valve closed position, the cam member 186 has been rotated to a position that its recess is beneath the protrusion of switch contact 188 and as a result the electrical connection between terminals 185, 187 is broken. Breaking the last mentioned electrical connection results in the solenoid coil 163 being de-energized; and accordingly, the relay contacts 172, 205, and 218 to move to an open condition. Movement of contact 172 to an open condition de-energizes bag holder solenoid coil 173 which results in valve member 176 being operated to apply air under pressure to line 174 and exhaust line 175. As a result, the bag holder jaw 70, 71 moves to an open condition to drop a bag 300 onto the conveyor 301.

Even though the relay 164 is de-energized, cam shaft 278 is still being rotated as the cam motor 276 is still energized through the circuit provided by switch member 273 electrically connecting contacts 271, 274. However, slightly further rotation of the shaft 278 brings the recess of cam 272 beneath the protrusion of switch contact 273, and as a result of the said protrusion dropping into the recess of cam member 272, the electrical connection is broken between members 271, 274. At this time the operating member 275 also drops in to the recess to prevent rotation of cam member 272 until solenoid coil 220 has again been energized. To be mentioned is that this slightly further rotation rotates cam member 186 sufficiently that the protrusion of switch member 188 is no longer in the recess of cam member 186 but rather it electrically connects terminals 185, 187.

At this time, the apparatus of this invention has completed one cycle of operation, and now the operator places another empty bag on the bag holder and thence steps on the foot switch to begin another cycle such as that described above. The cycle of operation for the second and succeeding cycles is the same other than that after the first cycle there is product in the measuring chamber, and as a result, upon the opening of the lower slide gates, product is emptied into the bag on the bag holder. To be mentioned is that as product flows through the measuring chamber into the bag, it is packed due to the resulting vibratory motion of the bag holder. After the measuring chamber is empty and the lower slide gates moved to a valve closed position in the manner described above, the filled bag is held on the bag holder spouts momentarily to insure that product is firmly packed in the bag due to the vibratory motion imparted to the bag prior to the time the bag holder jaws open to release the bag from the bag holder.

To be noted is that the discharge outlet of hopper 20, the apertures 23a, 91 in the valve housings, tubes 31, 61, 65, 39 and spout 67 are vertically aligned about a common vertical axis and that all the product contacting surfaces in the normal flow path of product from the supply hopper down to and through the spout are circular (no corners) and are vertical or at a steep angle to the horizontal to thereby make the unit self cleaning. That is, by depressing the manually operated switches 182, 233 to break an electrical connection and make an electrical connection respectively for the upper and lower knife valve sub-assemblies and while the vibrators are operating substantially any product in the unit (except in the valve chambers horizontally outwardly of the housing apertures on the opposite sides of the slide strips) will discharge through the spout.

Further, a common source of power (vibrators 25) on the tubular portions 22, 23 move hopper 20, the volumetric measuring chamber 27, 42, 31, 60 and the bag holder sub-assembly with a vibratory motion that is both angular and vertical. This moves the product being handled in a steady circular motion which conditions, feeds and packs the product whether the product be very fluid or a very sticky "hard to move" product; including packing the product in bag held by the bag holder sub-assembly.

The dual slide gates for each sub-assembly 27, 42 operate in pairs in a horizontal plane and ride on adjustable synthetic slide strips. However, there is room under the slide gates for any product which works by strips 93 to enter the respective valve chamber portion longitudinally between the respective strip 93 and the front or rear wall. All this product, which works past strips 93, 97 (longitudinally outwardly of said strips from apertures 91), will, due to the counter-clockwise rotation, discharge through the outlet opening into the respective container 120 which can be easily cleaned periodically.

Any product in the area of the land corners of the lower housing of sub-assembly 27 and the upper housing of sub-assembly 42 will, during the interval of time the lower slide gates are spread apart, work its way to fall through the adjacent aperture 91. This results due to the provision of strips 93–95 and the vibrating motion imparted to sub-assemblies 27, 42 from the vibrators 25 and the resulting circular motion imparted to the product. Likewise, any product on the land corner portions of the lower housing of sub-assembly 42 works its way to be discharged through the spout.

As many widely apparently different embodiments of the invention may be made without departing from the spirit and scope thereof, it is to be understood we do not limit ourselves to the specific embodiments herein.

What we claim is:

1. Apparatus for filling a bag comprising a frame mounted on a supporting surface to extend thereabove, a hopper including means having a discharge opening for retaining a supply of product, motor means supportedly mounted on the product retaining means for vibrating the product retaining means to impart a circulatory motion to the product and means for mounting the product retaining means on the frame a substantial distance above the supporting surface and cushioning the vibratory movement of the product retaining means relative the frame, means forming a volumetric measuring chamber dependingly secured to product retaining means to receive product passed through said discharge opening, said measuring chamber means including vertical tubular means for enclosing a hollow chamber, reciprocal first slide gate means supportedly mounted by said product receiving means for selectively permitting product flowing through the discharge opening flowing into the tubular means and alternately blocking flow of product through said opening to the tubular means, the upper end of said tubular means being supportingly attached to said first means and reciprocal second slide gate means in the lower end of said tubular means for selectively permitting discharge of product from said tubular means and alternately retaining product in said tubular means, bag holder means for releasably holding a bag above the supporting surface, and conduct product flowing from the tubular means into said bag while it is being held and said second slide gate means permits the discharge of product from the tubular means, means for mounting the bag holder means on the measuring chamber means in depending relation relative thereto and beneath the second slide gate means, and means for operating said slide gate means for retaining the first slide gate means to block the flow of product from the supply retaining means to the tubular means when the second gate means permits the discharge of product therefrom and the second slide gate means to block the flow of product from the tubular means to the bag holder means when the first slide gate means permits the flow of product from the supply retaining means to the tubular means, and the bag holder means to hold a bag when the second slide gate means permits the flow of product from the tubular means and thereafter release the bag while the second gate means again blocks the flow of product from the tubular means to the bag holder means.

2. Apparatus for filling a bag comprising a main frame mounted on a supporting surface to extend thereabove, a hopper on the frame including means having a discharge opening for retaining a supply of product, and means supportedly mounted on the product retaining means for vibrating the product retaining means, means forming a volumetric measuring chamber dependingly supported from the product retaining means to vibrate therewith and to receive product flowing through said discharge opening, said measuring chamber means including vertical tubular means for enclosing a hollow chamber, first valve means at the upper end of the tubular means for selectively permitting product flowing through the discharge opening flowing into the tubular means and alternately blocking flow of product through said opening to the tubular means, and second valve means at the lower end of said tubular means for selectively permitting discharge of product from said tubular means and alternately retaining product in said tubular means, bag holder means attached to said measuring chamber means to depend therefrom for releasably holding a bag above the supporting surface, and conduct product flowing from the tubular means into said bag while it is being held and when said second valve means permits the discharge of product from the tubular means, means for operating said valve means for retaining the first valve means to block the flow of product from the supply retaining means to the tubular means when the second valve means permits the discharge of product therefrom and the second valve means to block the flow of product from the tubular means to the bag holder means when the first valve means permits the flow of product from the supply retaining means to the tubular means, and the bag holder means to hold a bag when the second valve means permits the flow of product from the tubular means and thereafter release the bag while the second valve means again blocks the flow of product from the tubular means to the bag holder means, and means mounting product retaining means on the frame sufficiently above the supporting surface that a bag on the bag holder means is held thereby above the supporting surface for substantially solely supporting the weight of said product supply means, the measuring means, the bag holder means and a bag held by said bag holder means, and cushioning the vibratory movement of the product retaining means relative the frame.

3. The apparatus of claim 2 further characterized in that the mounting means includes a sub-frame and fluid filled isolators between said sub-frame and the main frame for mounting the sub-frame on the main frame, and that said measuring chamber means includes means dependingly supportedly mounted on the first valve means for mountingly supporting the second valve means in selected vertical positions relative thereto, said first valve means being supportedly mounted on the product retaining means, and that the tubular means includes a first tube dependingly secured to the first valve means and a second tube having a lower end fixedly attached to the second valve means and an upper end portion in slidable sealing relationship with the lower end portion of the first tube whereby vertically adjusting said valve means will vary the volume enclosed by said first and second tubes.

4. Apparatus for filling a bag comprising a frame mounted on a supporting surface to extend thereabove, a hopper including means for holding a supply of product including an annular portion having a discharge opening; means supportedly mounted on the product supply means for vibrating the product supply means and means for mounting the product supply means on the frame a substantial distance above the supporting surface and cushioning the vibratory movement of the product supply means relative the frame, first vertical tubular means for enclosing a hollow chamber, first valve means extending between the upper end of the tubular means and said annular portion for selectively permitting product flowing through the discharge opening flowing into the first tubular means and alternately blocking flow of product through said opening to said first tubular means, said first valve means being mounted on said annular portion to depend therefrom and attached to the upper end of the first tubular means, second valve means at the lower end of said first tubular means for selectively permitting discharge of product from said first tubular means and alternately retaining product in said first tubular means, a bag holder sub-assembly having a spout and means for releasably holding a bag on the spout, second vertical tubular means for conducting product from the second valve means to said spout when said second valve means permits discharge of product from the first tubular means, said bag holder sub-assembly being supportedly mounted on the second tubular means to depend therefrom, means dependingly attached to the first valve means for supportingly mounting said second valve means to extend between said first and second tubular means and supportingly attached to said second tubular means whereby the second tubular means is mounted at an elevation that the bag holder sub-assembly and the bag thereon are vertically above said supporting surface, means for operating said first valve means to block the flow of product from the product supply means to the first tubular means when the second valve means permits the discharge of product therefrom, and the second valve means to block the flow of product from the first tubular means to the second tubular means when the first valve means permits the flow of product from the product supply means to the first tubular means, and the bag holder means to hold a bag on the spout when the second valve means permits the flow of product from the second tubular means and thereafter release the bag while the second valve means again blocks the flow of product from the second tubular means to the spout.

5. The apparatus of claim 4 further characterized in that the means dependingly attached to the first valve means includes a plurality of spaced vertically guide members located horizontally outwardly of the tubular means, means for securing the upper ends of said guide members to the first valve means to depend therefrom, means mounted on the lower ends of guide members for mountingly supporting said second tubular means and means attached to the second valve means for mountingly supporting said second valve means on the guide members.

6. The apparatus of claim 5 further characterized in that the first tubular means comprises a fixed vertical tube dependingly secured to the first valve means and a second tube having a lower end fixedly attached to the second valve means to extend thereabove and an upper end portion surrounding said fixed tube in slidably sealing engagement therewith, that the second tubular means includes a third vertical tube fixedly attached to the means for mounting the second tubular means on the guide members and a fourth vertical tube having an upper end fixedly attached to said second valve means to depend therefrom in surrounded, slidably sealing relationship with the third tube, that the means for mounting the second valve means on the guide members comprising means cooperating with the guide members for releasably retaining the second valve means at any one of various selected adjusted elevations within a limited range to selectively vary the vertical spacing between said valve means and thereby the volume enclosed by said first and second tubes, and power operated means interconnecting the first and second valve means for selectively translating the first valve means relative to the second valve means when said cooperating means is in a released condition.

7. The apparatus of claim 6 further characterized in that each of the valve means includes a longitudinally elongated upper valve housing, a longitudinally elongated lower valve housing, means joining the upper and lower valve housings to enclose a valve chamber, the upper housing having a product inlet opening and the lower housing having a discharge outlet opening to tube dependingly secured to the respective valve means and knife valve means horizontally reciprocally mounted in the valve chamber for movement between a position blocking product flow vertically from the housing inlet opening to the housing discharge outlet and a position permitting free flow of product from said housing inlet opening to said housing discharge outlet.

8. The apparatus of claim 7 further characterized in that each lower housing has a horizontally centrally located, rectangular land with the discharge outlet extended therethrough, that the knife valve means includes a pair of horizontal slide gates, vertically adjustable means mounted on the lower housing for selectively varying the vertical position of the slide gates relative the housing and supporting the slide gates for longitudinal reciprocal movement between an abutting position overlaying the discharge outlet and a spread apart position, and sealing strip means on the corner portions of the lower housing lands to substantially limit the amount of product moving longitudinally off the last mentioned lands in a direction away from the discharge outlet and to direct product on the land corner portions to the discharge outlet as the vibrating means vibrate.

9. The apparatus of claim 8 further characterized in that each of the valve means has a valve chamber portion on the longitudinal opposite side of its land, that the lower housing has an outlet opening to each valve chamber portion, and that there is provided a container mounted beneath each valve chamber outlet to catch and hold any product falling through the respective valve chamber outlet.

10. The apparatus of claim 8 further characterized in that the second valve means upper housing has a centrally located, rectangular land with the inlet extended therethrough, that the knife valve means includes vertically adjustable means mounted on the last mentioned upper housing to bear against the upper surfaces of the adjacent slide gates and sealing strip means mounted on said last mentioned housing to substantially preclude product moving longitudinally away from the last mentioned land as the adjacent slide gates are moved to a product flow condition.

11. Apparatus for filling a bag comprising a frame mounted on a supporting surface to extend thereabove, a hopper including means having a discharge opening for retaining a supply of product, means forming a volumetric measuring chamber to receive product flowing through said discharge opening, said measuring chamber means being supportingly mounted on the product retaining means to depend therefrom and including vertical tubular means for enclosing a hollow chamber, first valve means mounted at the upper end of the tubular means for selectively permitting product flowing through the discharge opening falling into the tubular means and alternately blocking the flow of product through said opening to the tubular means, and second valve means mounted at the lower end of said tubular means for selectively permitting discharge of product from said tubular means and alternately retaining product in said tubular means, bag holder means for releasably holding a bag above the supporting surface, and conducting product flowing from the tubular means into said bag while it is being held and said second valve means permits the discharge of product from the tubular means, said bag holder means being supportingly mounted on the measuring chamber means to depend therefrom, motor means supportingly mounted on the product retaining means for vibrating the product retaining means, the measuring chamber means and the bag holder means, means for mounting the product retaining means on the frame a substantial distance above the supporting surface and cushioning the vibratory movement of the product retaining means relative the frame, and means for operaing said valve means for retaining the first valve means to block the flow of product from the product retaining means to the tubular means when the second valve means permits the discharge of product therefrom and second valve means to block the flow of product from the tubular means to the product holder means when the first valve means permits the flow product from the supply retaining means to the tubular means and the bag holder means to hold a bag to receive the product when the second valve means permits the flow of product from the tubular means and thereafter release the bag while the second valve means again blocks the flow of product from the tubular means to the bag holder means.

12. For bag filling apparatus, a knife valve assembly comprising a generally rectangular, longitudinally elongated lower housing having a top wall and an upper housing having a bottom wall; means for joining said housings together to form an enclosed valve chamber; each housing having a longitudinally, centrally located, generally rectangular land extending toward and spaced from the land of the other housing and an aperture opening through the housing and the respective housing land to the valve chamber; a pair of generally flat plate slide gates in said chamber and longitudinally movable between a position blocking the product flow from the upper housing aperture to the lower housing aperture; and alternately a position spread apart to permit product flow between said apertures; adjustable slide strip means mounted on each housing for slidably holding each slide gate to move in substantially the same plane in substantially spaced relationship from the respective housing wall; said slide strip means including a pair of transverse slide strips on each land on opposite longitudinal sides of the aperture through the land bearing against the adjacent surface of the respective slide gate and extending tangentially adjacent the respective apertures; said housing, means joining the housing and said transverse slide strips having portions cooperating with the slide gates to divide said valve chamber into a valve chamber portion located longitudinally outwardly of the respective transverse slide strip from said apertures, the lower housing having a product outlet for each valve chamber portion; means mounted on the lower housing for catching and retaining product falling through the respective product outlet; and fluid operated means on opposite longitudinal sides of the housing and extended into the valve chamber for translatorily moving the slide gates between said position.

References Cited

UNITED STATES PATENTS

| | | | |
|---|---|---|---|
| 1,879,794 | 9/1932 | Cundall | 141—78 X |
| 2,424,842 | 7/1947 | Olney | 141—74 |
| 2,757,894 | 8/1956 | Kindseth | 141—72 X |

FOREIGN PATENTS 421,382  12/1934  Great Britain.

SAMUEL ROTHBERG, *Primary Examiner.*

H. S. BELL, *Assistant Examiner.*